Patented Sept. 29, 1925.

1,555,314

UNITED STATES PATENT OFFICE.

WILHELM ROHN, OF HANAU, GERMANY.

PROCESS FOR IMPROVING THE QUALITY OF METALS OR MELTING UNDER REDUCED PRESSURE.

No Drawing.   Application filed March 9, 1920. Serial No. 364,603.

(GRANTED UNDER THE PROVISIONS OF THE ACT OF MARCH 3, 1921, 41 STAT. L., 1313.)

*To all whom it may concern:*

Be it known that I, WILHELM ROHN, a citizen of Germany, and resident of Hanau, Germany, have invented a new and useful Process for Improving the Quality of Metals or Melting Under Reduced Pressure (for which I filed application in Germany, April 18, 1918), of which the following is a specification.

The inventor has disclosed a process, according to which metals and metal alloys and their compounds with metalloids can be melted free from gas at a reduced pressure.

To secure a technically valuable degasification, the melting must be performed within a practically absolutely airtight furnace. During such melting a constant pressure may be employed, which may vary from 1000 grammes per square centimetre to practically nil, according to the properties of the metal bath to be treated and to the effect to be obtained and must act for a more or less long period suitable to the special case. In special cases the melt may, however, be successively exposed to different constant pressures during a suitable time.

It may also be of advantage, to expose the melt during a suitable long time to a given suitable temperature or successively to different temperatures.

Lastly the material thus treated may be allowed to cool down until solidification for inducing an expulsion of gas, whereupon the melting process hereinbefore mentioned may be repeated.

This process is excellently suited for carrying out certain melts which heretofore in practice could not be performed at all or only very imperfectly and with which therefore the desired purity of the melt or the intended improvement of the qualities could not be secured to a sufficient extent or with the necessary regularity.

For example, it was not possible to transform by melting on an industrial and commercial scale metals which had been produced by chemical precipitation, electrolysis or by distillation, and which possess a high chemical purity, from the spongy or pulverous state into the reguline state without exposing them to the influence of the air or of the furnace gases and in consequence thereof introducing into them oxides of the metals or impurities from the furnace gases, or giving them an opportunity of absorbing gases. By the absorbing of such impurities not only the quality and purity of the metals was impaired, but the properties of the melts varied so much that their use for articles of high efficiency or of highest precision was prejudiced.

For producing high quality metals heretofore common trade metals were remelted under special precautions and frequently with purifying additions after various methods in reverberatory furnaces, Martin furnaces, crucibles or electric furnaces without having always obtained a moderate regularity and the high qualities aimed at.

The cause of this was that it was not possible to shield the metal bath against the injurious action of the oxygen of the air, of the impurities absorbed from the furnace gases and against absorption of various gases by the metal bath. The unsatisfactory results were, furthermore caused by the fact that some components of the metal bath were oxidized and lost in larger or smaller but always not ascertainable quantities during the melting process.

It is known that different substances (impurities) have an unfavorable influence on the properties of the metals, it is also known that these influences may increase or nullify each other. But it is not known that the content of gas in metals may greatly increase the unfavourable effect on the other impurities. The inventor has found by extensive researches that also on a manufacturing scale the properties of metals of commercial quality may be greatly improved, by remelting such metals after the process disclosed in his prior application No. 363,916, filed March 6, 1920. It has also been possible to produce uniform qualities in a very regular manner, by carefully analysing the commercial article and compensating for irregularities in its composition by small additions of ingredients (like metals or metalloids) influencing the composition of the alloy in the sense of eliminating as well as of adding certain constituents, and which may be made before or during the remelting.

The improving influence is noticed in several respects. The products are free of macroscopic and microscopic blowholes; have very few inclusions of slags and oxides, and are practically free of noxious gases. All forging operations are greatly facilitated, besides the product becomes softer and tougher, without losing in strength. Thereby it becomes better suited for certain cold working processes, such as cold drawing, cold pressing and the like.

The metals produced according to the process applied for, are more easily drawn, when intended for wire, and may be subjected to greater reduction of section, before they have to be annealed to remove the hardening caused by the said cold drawing. Some metals and alloys which heretofore could not be worked in such manner, may now be thus worked, when produced after the process applied for.

What I claim is:

1. The process of degasifying more or less impure metals consisting in regulating the composition of such metal by suitable additions and melting them under a reduced pressure within a practically airtight furnace under a constant pressure which may vary from one thousand grammes per square centimeter to practically zero according to the purpose intended and at a suitable temperature, both temperature and pressure being maintained for a relatively long period and varied according to the properties of the components of the impure meatl or alloy whereby the induction and completion of automatically appearing metallurgical reactions is enabled, effecting a further emission of gas by solidification, and finally removing these gases which have been partly retained in the metal and forming blisters during solidification by reheating beyond the melting point.

2. The process of degasifying more or less impure metals consisting in regulating the composition of such metal by suitable additions and melting them in a practically airtight furnace under successively varying conditions of temperature and reduced pressure.

3. The process of degasifying more or less impure metals consisting in analyzing the commercial metal to determine its composition, melting the metal in a practically airtight furnace a plurality of times under predetermined conditions of temperature and reduced pressure and compensating for irregularities in its composition by small additions before or during remelting.

In testimony, that I claim the foregoing as my invention I have signed my name.

Dr. WILHELM ROHN.